(12) United States Patent
Pilu

(10) Patent No.: US 7,453,493 B2
(45) Date of Patent: Nov. 18, 2008

(54) IMAGE STABILIZATION

(75) Inventor: Maurizio Pilu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 848 days.

(21) Appl. No.: 10/963,161

(22) Filed: Oct. 12, 2004

(65) Prior Publication Data

US 2005/0093985 A1   May 5, 2005

(30) Foreign Application Priority Data

Oct. 31, 2003   (GB)   ................................. 0325469.5

(51) Int. Cl.
*H04N 5/228* (2006.01)
(52) U.S. Cl. .................. 348/208.6; 348/208.3
(58) Field of Classification Search ............ 348/208.99, 348/208.1, 208.4–208.6, 620; 386/117
See application file for complete search history.

(56) References Cited

U.S. PATENT DOCUMENTS

| | | | | |
|---|---|---|---|---|
| 4,885,757 A | * | 12/1989 | Provence | .................... 375/343 |
| 5,060,074 A | * | 10/1991 | Kinugasa et al. | .......... 348/208.6 |
| 6,809,758 B1 | * | 10/2004 | Jones | .................... 348/208.99 |
| 2003/0090593 A1 | * | 5/2003 | Xiong | ........................ 348/620 |
| 2004/0001705 A1 | * | 1/2004 | Soupliotis et al. | ........... 386/117 |

FOREIGN PATENT DOCUMENTS

GB    2365244 A    2/2002

OTHER PUBLICATIONS

UK Search Report dated Mar. 9, 2004.

* cited by examiner

*Primary Examiner*—Lin Ye
*Assistant Examiner*—Dennis Hogue

(57) ABSTRACT

A video stabilization scheme which uses a dynamic programming algorithm in order to determine a best path through a notional stabilization band defined in terms of a trajectory of an image capture element. The best path is used in order to produce an optimally stabilized video sequence within the bounds defined by the image capture area of the image capture element.

34 Claims, 11 Drawing Sheets

IMAGE STABILIZATION

TECHNICAL FIELD

The present invention relates to the field of image sequence stabilization.

CLAIM TO PRIORITY

This application claims priority to copending United Kingdom utility application entitled, "IMAGE STABILIZATION," having serial no. GB 0325469.5, filed Oct. 31, 2003, which is entirely incorporated herein by reference.

BACKGROUND

An image stabilization process allows an image or video sequence to be captured, stored or rendered with a reduced (or eliminated) amount of apparent motion caused by a secondary, unintentional motion of an image or video sequence capture device with respect to a scene or object being captured, whilst preserving a dominant, intentional motion of the capture device. The image or video capture device could be a camera (digital or other), a camcorder (digital or other), or any other device capable of capturing an image or sequence of images for storage in the device or elsewhere.

It is desirable for images, or a sequence of images (hereinafter referred to as a "video sequence"), captured using an image capture device to be processed to provide image stabilization either during capture, using the image capture device, or when viewed or played back, using video playback equipment. The processing commonly takes the form of filtering or correction of the image or video sequence in order to remove undesirable elements such as motion blur, for example, which may be caused by movement of the image capture device during the capture procedure.

Several classes of image stabilization methods exist, for example mechanical, electromechanical, optical and electronic stabilization.

Recently, interest in the use of user-wearable image capture devices has resulted in stabilization methods being applied to images captured from these types of devices. Such user-wearable devices may have stabilization functionality built-in, or may rely on stabilization of captured image data being carried out in another system distinct from the device itself.

The nature of a user-wearable image capture device implies that any images captured from it will be intrinsically 'noisy' due to motion and vibrations introduced to the device by a user's movements, intentional or unintentional. Such 'noisy' image data may best be characterized as data which includes a secondary (to the data of the scene or object to be captured), undesirable element such as a low-frequency element in a video sequence due to a user walking or running, for example, or a high-frequency element in a video sequence due to a user travelling in a vehicle, for example. It will be appreciated that further types of undesirable data may be introduced into image data due to device rotation etc.

In order to reduce the problem of 'noisy' image data, the above-mentioned stabilization methods have been applied to captured sequences. For example, U.S. Pat. No. 5,502,484 describes a shake detection and correction method for use in video cameras and video signal reproducing apparatus. Further, U.S. Pat. No. 5,253,071 describes a method and apparatus for stabilizing an image produced in a video camera.

The above-mentioned stabilization techniques, when applied to sequences in which device motion can be dramatic, such as user wearable devices, for example, are not optimal, and a compromise is generally required between attenuating high frequency motion and obtaining a step response.

SUMMARY

According to an exemplary embodiment, there is provided a method of stabilizing a sequence of images captured from respective sub-areas of a capture area of an image capture element, the method comprising receiving data relating to a path of the image capture element during capture of a sequence of images for a desired size of image; defining, in association with the received data, at least two boundary conditions defining a stabilization band for the sequence; and using captured image data disposed within the stabilization band, deriving a stabilization path within the band for the sub-areas.

According to another embodiment, there is provided a method of stabilizing a sequence of images comprising receiving data relating to a component of motion of an image capture element; receiving data captured using said image capture element; defining at least two boundary conditions relating to a desired size of image for the stabilized sequence using said data relating to a component of motion of the image capture element, the at least two boundary conditions defining a stabilization domain for the component of motion; deriving a stabilization path which lies within said stabilization domain; and processing the captured data, using said stabilization path, in order to generate data for forming the stabilized image sequence.

According to another embodiment, there is provided apparatus suitable for stabilizing a sequence of images captured from respective sub-areas of a capture area of an image capture element, comprising a processor that receives data relating to a path of the image capture element during capture of a sequence of images; a model that defines, in association with the received data, at least two boundary conditions defining a stabilization band for the sequence for a desired size of image, wherein the processor derives a stabilization path within the band using captured image data disposed within the stabilization band, for the sub-areas.

BRIEF DESCRIPTION OF THE DRAWINGS

The components in the drawings are not necessarily to scale relative to each other. Like reference numerals designate corresponding parts throughout the several views, and reference is made to the following figures in which.

The terms "comprises" or "comprising" when used in this specification specify the presence of stated features, integers, steps or components but do not preclude the presence or addition of one or more other features, integers, steps, components or groups thereof.

DETAILED DESCRIPTION

Figure 1:
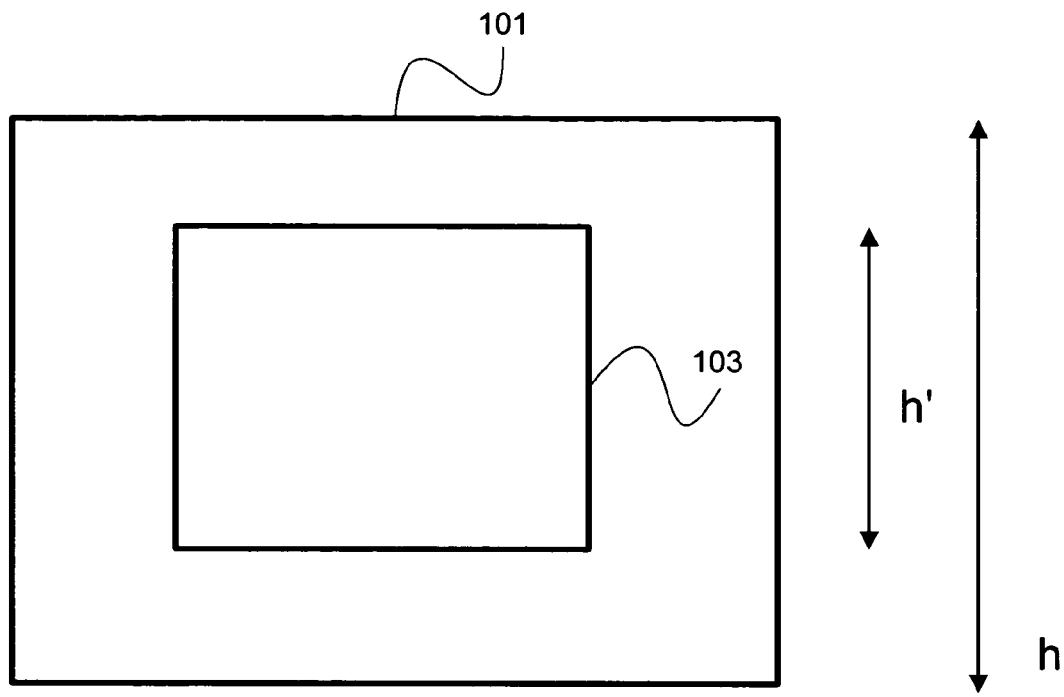
FIG. 1 is a diagrammatic representation of an image capture element.
Figure 10:
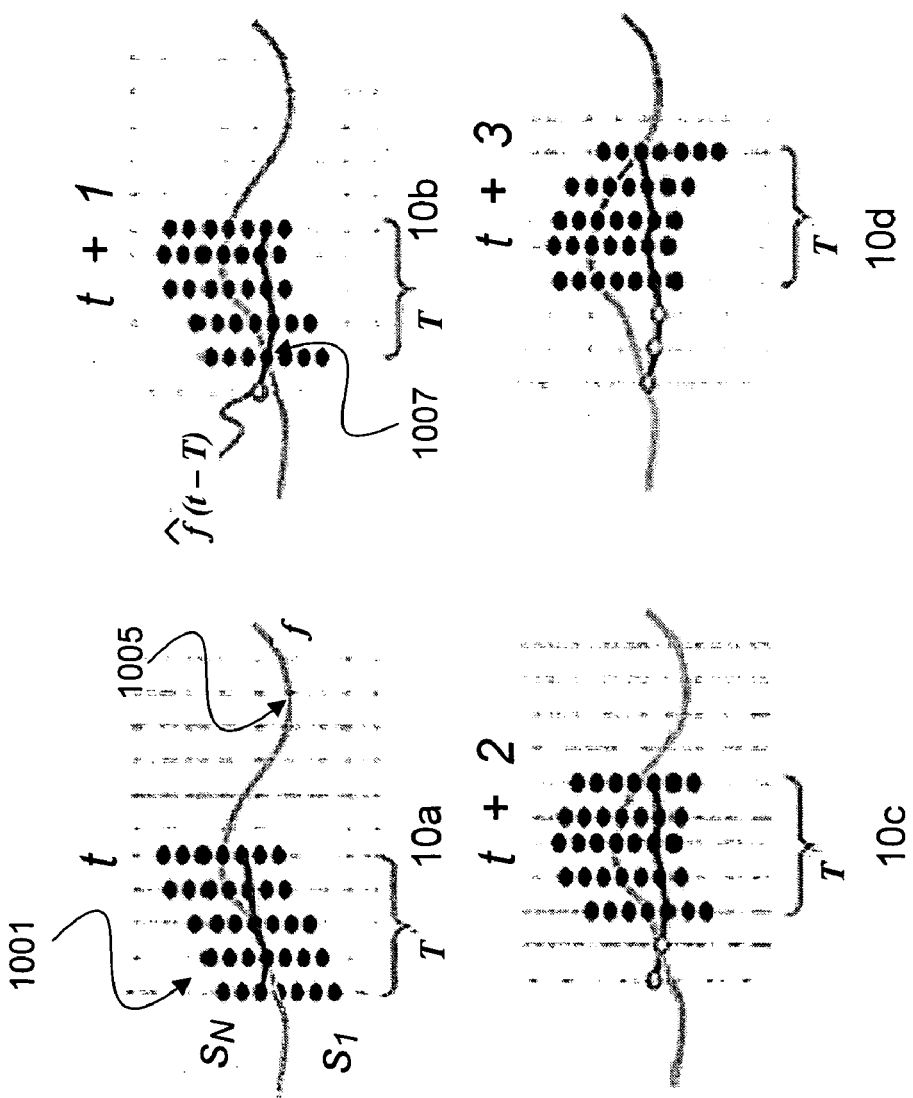
FIGS. 10a to 10d are diagrammatic representations of a further stabilization procedure.

FIG. 1 is a diagrammatic representation of an image capture element 101 of an image capture device (see, for example, FIG. 10 and the related description). The image capture element 101 has an area upon which light passing through any lens assembly of the image capture device is incident.

The element 101 shown in FIG. 1 is the effective capture area of a CCD (charge-coupled device). Alternatively, the element 101 is a CMOS (complementary metal oxide semiconductor) device or any suitable device operable to provide a signal in response to light incident upon it.

Each image frame of an image sequence or video sequence is captured via the image capture element 101 using known methods.

Undesirable movement of the image capture device is translated to a sequence of images captured by that device using the image capture element 101. Such undesirable movement may be, for example, unintentional movement of the image capture device with respect to a scene and/or object of interest being captured.

In order to achieve stabilization of a sequence of images, wherein each image of the sequence is a frame of the sequence, a size of a sequence of images is fixed at a certain percentage of the original size of the capture image capture element 101, that is to say, the viewable dimensions of a frame of a stabilized sequence of images are a percentage of the viewable dimensions of the corresponding frame from the originally captured sequence of images.

The viewable dimensions of a frame of a stabilized sequence of images could, therefore, be 90% of the original size of the viewable dimensions of the corresponding frame from the sequence of images captured using the image capture element 101, for example. Alternatively, the viewable dimensions of a frame of a stabilized sequence of images could be any suitable percentage of the original size of the viewable dimensions of the corresponding frame from the sequence of images captured using the image capture element 101.

In this connection, a conceptual "sub-area" 103 of the image capture area of the image capture element 101 is provided, which is moved across the area of image capture element 101 in order to compensate for unintentional movement and obtain a stabilized sequence of images. The size of the sub-area 103 may vary depending on the level of stabilization required.

Stabilization of a captured sequence of images proceeds by moving the sub-area 103 within the boundary defined by the area of the image capture element 101. In order to facilitate stabilization, and in response to an estimation of the movement of the image capture device, using known techniques, a stabilization band is defined as will be described below. The stabilization band provides a domain within which a path, along which the sub-area 103 is moved, is located. Advantageously, the central point of the sub-area 103 follows the path within the domain defined by the stabilization band.

Figure 2:
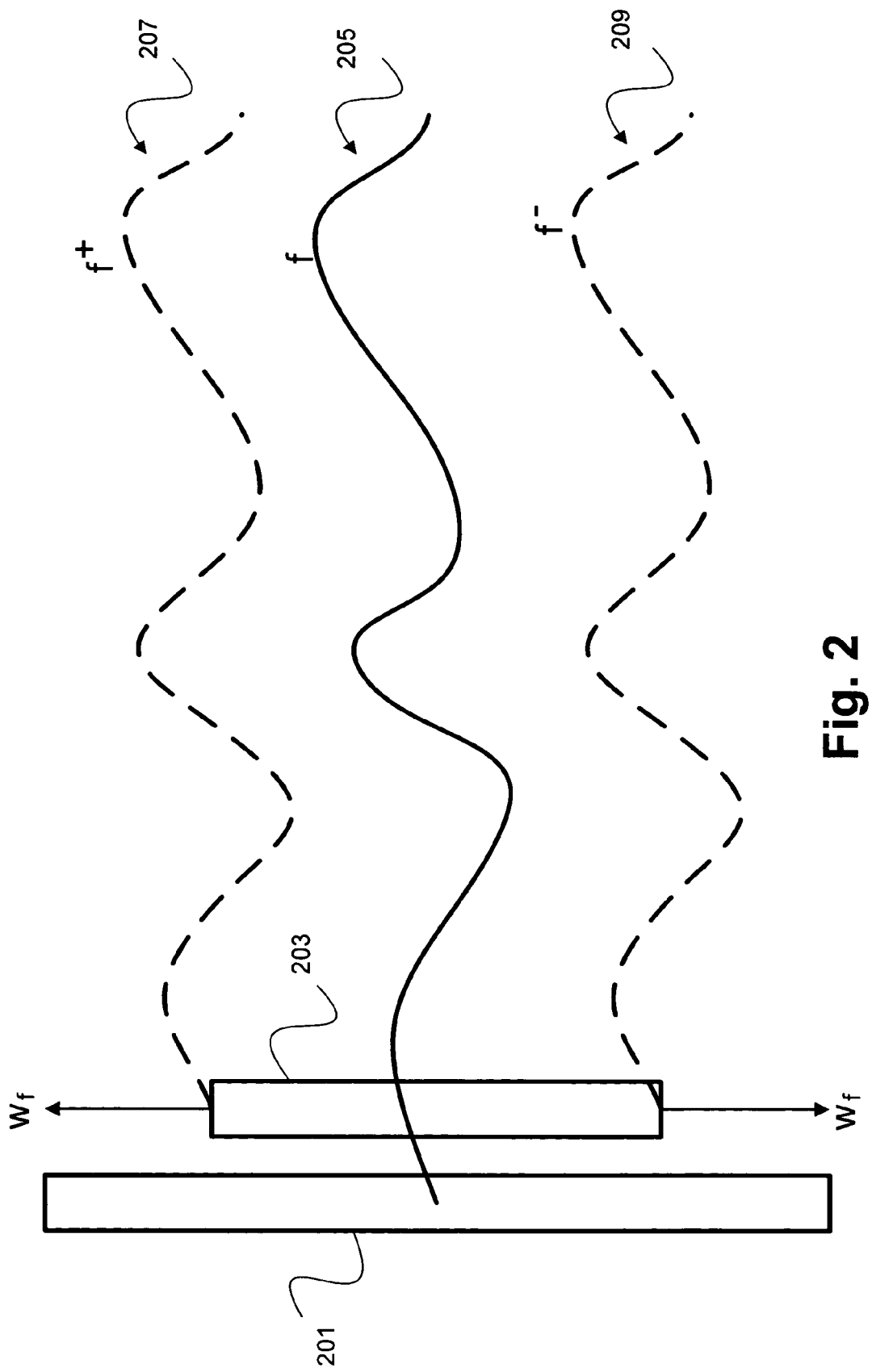
FIG. 2 is a diagrammatic representation of a path of an image capture element.

In FIG. 2, which is a side view of an arrangement of the image capture element 201 and the sub-area 203, a path 205, $f(t)$, of the image capture element 201 in a spatial dimension with respect to time, t, is depicted diagrammatically. The path 205 represents the movement of the image capture element 201 in the vertical direction with respect to time. It will be appreciated that the path of the image capture element 201 will vary over all three Euclidean spatial dimensions however, and that only one has been depicted for the sake of clarity. The path of the image capture element 101 is depicted as a single line originating from the center of the element 201. Each point of the element 201 will follow the same path.

With reference to FIGS. 1 and 2, the sub-area 103, 203 is allowed to move vertically in either direction no more than a distance $w_f=(h-h')/2$. The boundary condition $W_f$ therefore represents the limit to which maximum compensatory motion may be applied to the sub-area 103, 203 in the vertical direction in order to obtain a stabilized sequence of images whose frames lie within the area defined by the image capture element 101, 201. In this connection, a corresponding stabilization band is defined as depicted in FIG. 2. The stabilization band is bounded by two curves, $f^-(t)$ 207, and $f^+(t)$ 209 where, $f^-(t)=f(t)-w_f$, and $f^+(t)=f(t)+w_f$.

Figure 3:
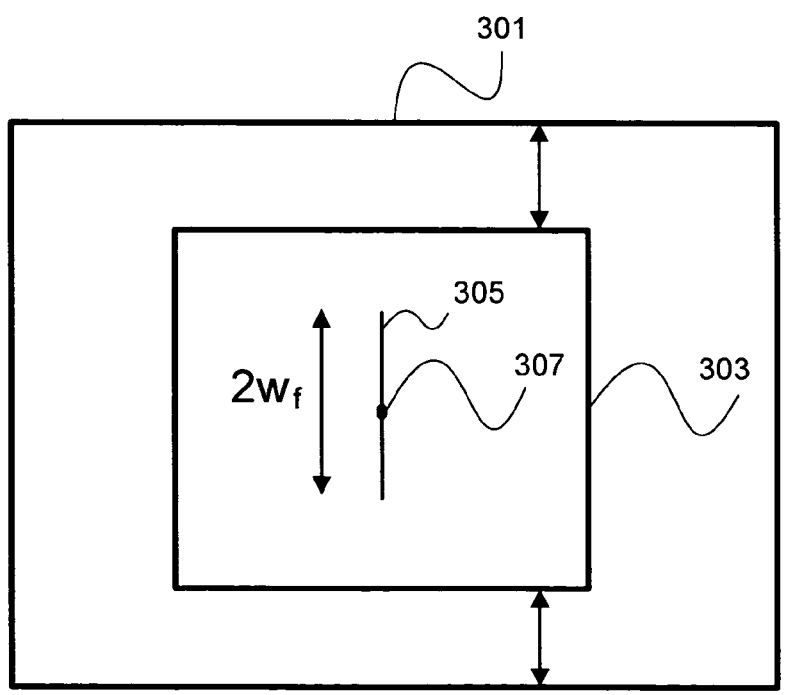
FIG. 3 is a further diagrammatic representation of an image capture element.

The stabilization band defined by the curves 207, 209 and corresponding to the path 205 of the element 101, 201, is advantageously positioned in relation to the central point of the area defined by the image capture element 101, 201 as depicted in FIG. 3, such that the stabilization band extends along a line of length 2 $w_f$ centered at a point 307 of FIG. 3 which lies at the center of the image capture element 101, 201, 301 and the sub-area 103, 203, 303. In this manner, the sub-area 103, 203, 303 is positioned in order that it may move across the element 103, 203, 303 in either vertical direction so as to provide the compensatory motion up to the maximum allowable by the bounding curves 207, 209 of FIG. 2.

Figure 4:
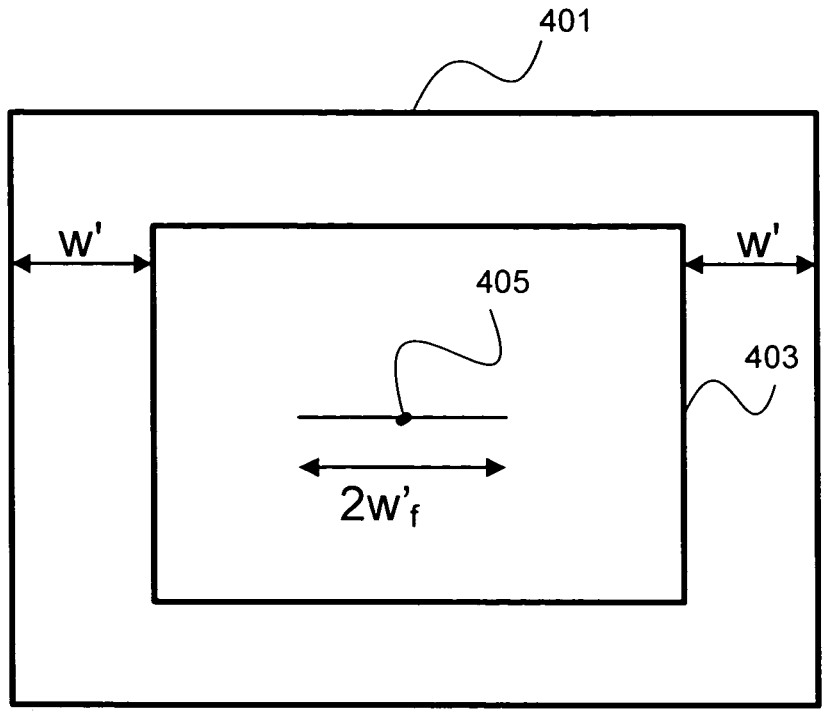
FIG. 4 is a further diagrammatic representation of an image capture element.

Similarly, a corresponding boundary condition exists for compensatory motion in the horizontal direction as depicted in FIG. 4. Here the maximum compensatory motion of the sub-area 403 is $w'_f$ in either horizontal direction. The stabilization band extends over the sub-area 403 a distance 2 $w'_f$, and is centered, in the same way as in FIG. 3, at the point 405 which is at the center of the element 401 and the sub-area 403.

In order to facilitate stabilization of a sequence of images, a family of continuous paths (or trajectories) within the band defined by the two bounding curves $f^-(t)$ 207 and $f^+(t)$ 209 of FIG. 2 exists, one of the paths being that which is followed by the point 307, 405 of the sub-area 303, 403. The method used to determine the path followed is described below.

The family, F, of permissible, mathematically continuous paths g(t) within the band defined by the curves 207, 209 of FIG. 2, to which the motion of a capture element and hence the image sequence captured therefrom could be stabilized to, are, $$F=\{g(t)\in C^0(\Re)\wedge f^-(t)\leq g(t)\leq f^+(t)\}.$$

An 'optimally' stabilized trajectory, $\hat{f}(t)$, is obtained from the F.

The path $\hat{f}(t)$ is 'optimal' in the sense that it is the continuous function within the family F which has the shortest path length within the band defined by the curves 207, 209 of FIG. 2, and/or it is the smooth function within the family with the minimum curvature. It will be appreciated that other definitions of optimality are applicable, and the above are not intended to be limiting. The function will be 'smooth' provided that it has continuous derivatives up to a desired order over the domain of the stabilization band.

Figure 5:
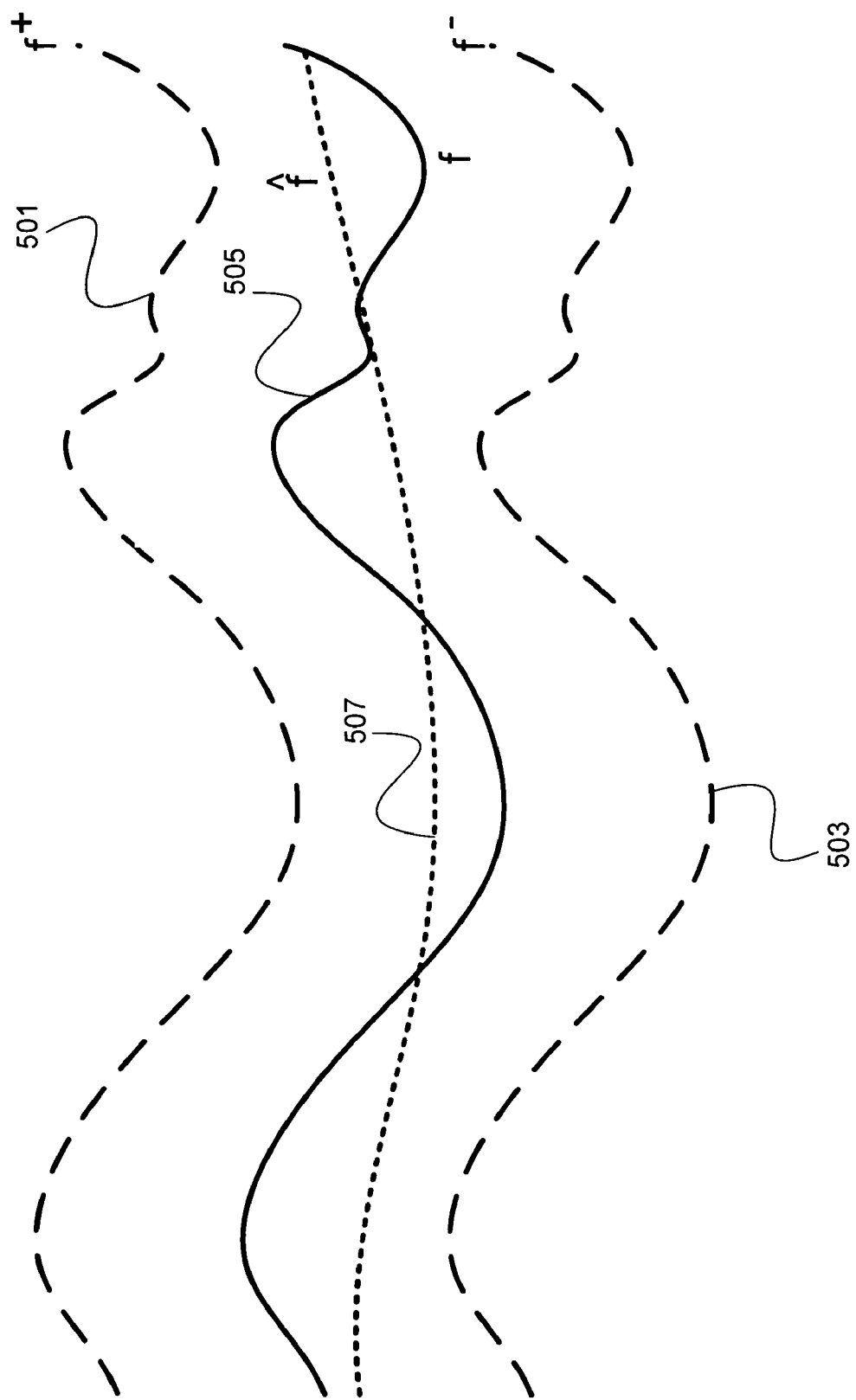
FIG. 5 is a further diagrammatic representation of a path of an image capture element.

The path $\hat{f}(t)$ is depicted diagrammatically in FIG. 5 by the line 507. In FIG. 5, the upper and lower bounding curves 501, 503 define the stabilization band based on the path 505 of the image capture element (not shown) as described above with reference to FIGS. 2 to 4. The path $\hat{f}(t)$ is obtained by firstly defining a 'cost' functional, E[g(t)] such that, $$E[\hat{f}(t)] \leq E[g(t)] \forall g(t) \in F.$$

The functional E[ ] may be any suitable functional which is a real valued function on the vector space of functions within F.

When the functional represents the arc length of a curve within the band defined by the curves 501 and 503, then the optimally stabilized path $\hat{f}(t)$ 507 is the geodesic in the domain bounded by the curves 501 and 503, i.e., the locally length-minimizing curve within the stabilization band defined by the curves 501, 503.

Figure 6:
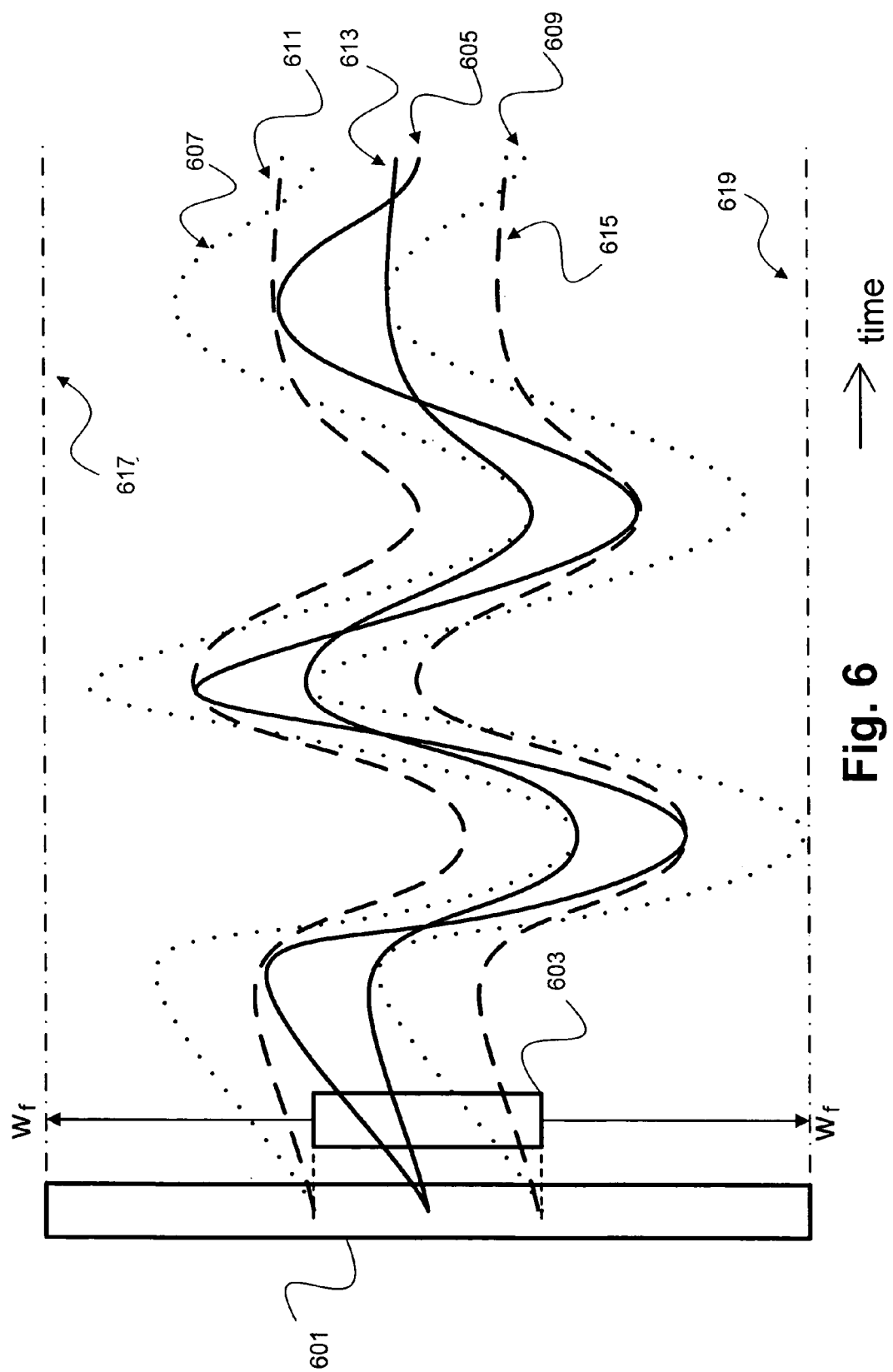
FIG. 6 is a further diagrammatic representation of a path of an image capture element.

A further path 605 is depicted diagrammatically in FIG. 6. In FIG. 6, the upper and lower bounding curves 607, 609 define the stabilization band based on the path 605 of the image capture element 601 as described above with reference to FIGS. 2 to 4. A stabilization band defined by the curves 611, 615 is derived from a stabilization path 613 as will be described in more detail below. The stabilization band defined by the curves 611, 615 defines a domain within which the stabilization path 613 lies. The width of the stabilization band is derived from the boundary conditions (e.g., $w_f$ or $w'_f$ as described above). It will therefore be appreciated that movement of the (center of the) sub-area 603 along the stabilization path 613 will result in the sub-area 603 moving within the domain bounded by the curves 611, 615. Accordingly, the sub-area 603 will always remain within the lines 617, 619 which define the capture area of the image capture element 601. In this connection, a stabilized sequence of images is obtained such that the sub-area 603 does leave the area defined by the lines 617, 619.

Any suitable functional may be chosen depending on the type of stabilization required, and the above is not intended to be limiting. The functional could be that which provides a solution in the form of a minimum energy curve, for example, such that the 'smoothness' of the curve $\hat{f}(t)$ 507, 613 is optimised. The exact nature of the chosen functional is, therefore, not important and will be chosen in response to the level of stabilization required.

For the purposes of the present description, and in order to determine the curve 507, a functional representing an arc length of a curve is defined as $$E[f(t)] = \int \sqrt{\left[\left(\frac{\partial f(t)}{\partial t}\right)^2 + 1\right]} dt$$

and, the family of curves F is parameterized as follows, $$g(t) = f(t) - w_f + 2w_f \lambda(t)$$

such that $\lambda(t): \Re \to [0,1]$. Given that $f(t)$ is a constant in the family F, the functional minimizer, $\lambda(t)$, must be determined.

Accordingly, a trajectory curve, such as that represented by path 505 of FIG. 5, has a finite length, and is sampled at discrete time intervals $T=\{t_1, t_2 \ldots t_T\}$. This corresponds to the real case in which image motion measurements occur at frame intervals and a sequence of images is T frames long, and each image of a sequence is a frame.

The range of $\lambda(t)$ is quantised into N steps, or states, $\Lambda = \{s_1, s_2, \ldots, s_N\}$ with $s_1 = 0, s_N = 1$. For convenience, a mapping function, s(i), is defined such that $s(i) = s_i \in \Lambda$.

Using a discrete representation of time, where t represents the sample (or frame) number, a curve g(t) is approximated by a piecewise polynomial whose vertices at time $t_k$ are given by $$g(t_k) = f(t_k) + w_f - 2w_f s(q_k)$$

where $q_k \in 1 \ldots N$ and $t_k \in T$ are indexes into the quantised values of S.

Figure 7:
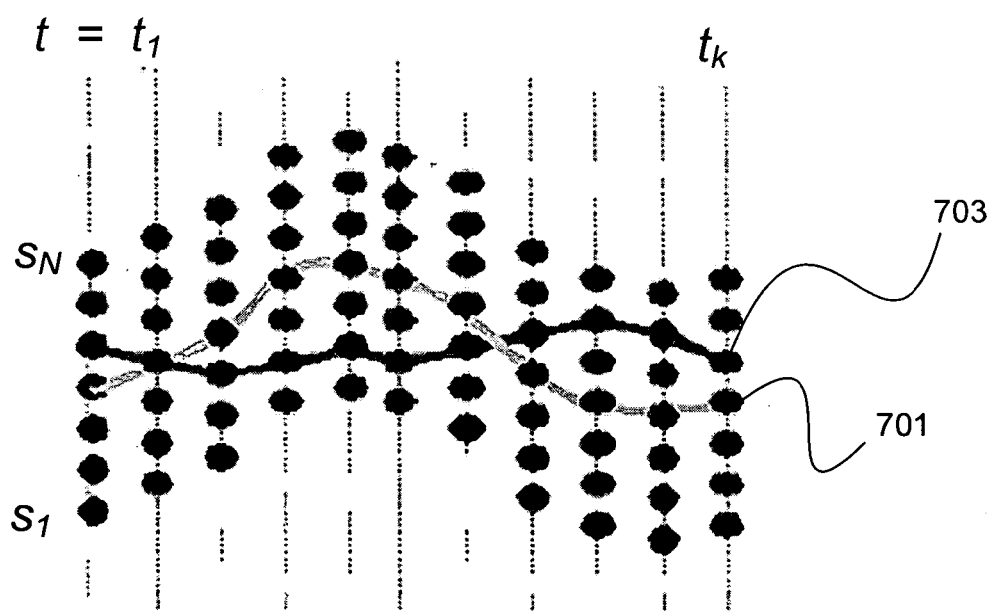
FIG. 7 is a diagrammatic representation of a stabilization trellis.

A discrete curve $g(t_k)$ can therefore be represented by a sequence of states, $Q = \{q_1, q_2, \ldots, q_T\}$. An example is depicted in FIG. 7 in which displacement from the trajectory 701 is represented by a curve generated from discrete states 703.

The functional minimizer is determined using a dynamic programming algorithm such as the Viterbi algorithm, for example, as will be described in more detail below. Other dynamic programming algorithms may be implemented in order to minimize the chosen finctional. For example, the Baum-Welch algorithm may provide a suitable alternative. For a discussion of the Viterbi algorithm, the reader is referred to G. D. Forney, The Viterbi Algorithm, Proceedings of the IEEE, 61(3), 1973, incorporated herein by reference.

A state transition cost is defined, such that a state sequence (path) minimizing a functional using a dynamic programming method can be obtained. As mentioned above, the Viterbi algorithm is used to minimize the functional. Other alternatives are possible.

The state transition cost, $a_{ij}(t)$ is the cost of moving from state $s_i$ to $s_j$ at a given time $t_k$. The cost of moving from one state to another can be determined from the particular functional used.

For example, the $a_{ij}(t)$ may be determined from the Euclidean distance between the states $s_i$ and $s_j$ at time $t_k$, such that, $$a_{ij}(t) = |f(t_i) - f(t_j) - 2w_f(s_i - s_j)|.$$

The time step is factored out as this is constant for all $a_{ij}$.

The Viterbi method comprises four steps, which are defined below. Below, the $\delta(i)$ define a best cost along a trellis path up to time t that ends in state $s_i$, the $\psi(j)$ define the best state at a time t−1 that leads to state $s_j$ at time t, and the $\Pi = \{\pi_1, \ldots, \pi_n\}$ are the cost associated with each of the states at t=1, that is the cost associated with each of the states at the beginning of a trellis. The trellis is a two-dimensional array of discrete points. The choice of configuration of points may vary, as may the density of points within the array. FIGS. 7 and 10a-d include examples of trellis's. The configuration of points and their density is not intended to be limiting.

The Viterbi algorithm proceeds via the following algorithmic steps,
1. Initialization;

$$\delta_1(i) = \pi$$

$$\psi_1(i) = 0$$

Here the $\delta_1(i)$ are assigned an initial value from the set $\Pi$.
2. Recursion;

$$\delta_t(j) = \max_{1 \leq i \leq N} [\delta_{t-1}(i) a_{ij}(t)]$$

$$\psi_t(j) = \operatorname*{argmax}_{1 \leq i \leq N}[\delta_{t-1}(i) a_{ij}(t)]$$

for $2 \leq t \leq T$ and $1 \leq j \leq N$. For each state at a given time, t, the best cost along the trellis is obtained from the previous (t−1)

cost and the current state transition cost. The $\psi_t(j)$ are backpointers which point to the predecessor that optimally provokes the current state. The "arg max" selects the index i which maximizes the bracketed expression.

3. Termination;

$$\hat{q}_T = \operatorname*{argmax}_{1 \le i \le N}[\delta_T(i)]$$

4. Path Backtracking;

$$\hat{q}_t = \psi_{t+1}(\hat{q}_{t+1})$$

for t=T−1, . . . ,1.

For this particular use of the Viterbi method, the initial costs $\Pi$ can be assigned to force the best path to go through the central state, for example, by setting $\pi_{N/2}=0$ and $\pi_i>>0, i \ne N/2$. Other alternatives are possible as will be appreciated by those skilled in the art.

The assignment of the initial costs as described above provides the advantage that a stabilized path may be biased towards, or forced through, a particular state during the stabilization procedure. In this connection, relevant information contained within the data representing the path of the element of an image capture device may be preserved, and will therefore not be filtered out in the stabilization process.

A sequence of states thus found, $\hat{Q}=\{\hat{q}_1, \hat{q}_2, \ldots, \hat{q}_T\}$ defines, through $g(t_k)$, a trajectory $$\hat{f}(t_k) = f(t_k) + w_f - 2w_f s(q_k)$$

which is the geodesic in the domain bounded by the curves 501, 503, of FIG. 5, i.e., the locally length-minimizing curve within the stabilization band centered on 505 and defined by the bounding curves 501, 503.

A sequence of images is therefore stabilized according to the boundary conditions imposed by size of the sub-area.

Figure 8:
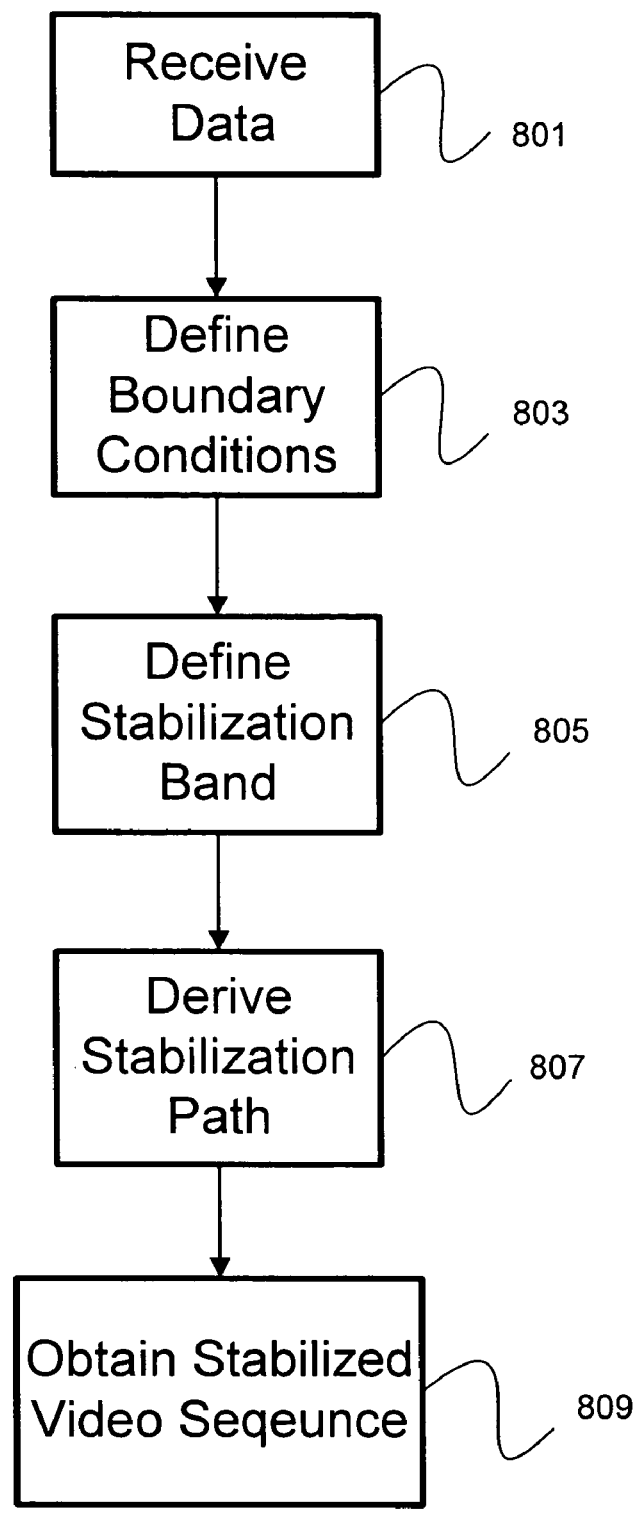
FIG. 8 is a flow diagram representing a stabilization procedure.

FIG. 8 is a flow diagram representing the procedure to be followed in order to obtain a stabilized sequence of images as described above.

At step 801, data relating to a sequence of images is received by an image capture device (not shown). The reception of the data could be 'on-line' or 'off-line', i.e., the received data could be that corresponding to a pre-captured sequence of images (off-line case), or it could be that received whilst an image capture device is in operation (on-line case). Specifically, the received data relates to a path of an image capture element of an image capture device in a spatial dimension with respect to time. The path of the image capture element may be determined using known motion estimation techniques such as an electronic or mechanical motion estimation technique for example. The path relates to motion in a spatial dimension with respect to time, and is therefore related to a component of the motion of an image capture element with respect to time. Such components could be those relating to orthogonal components of motion in each of the three Euclidean spatial dimensions, for example. A further component may be obtained relating to rotation of the element about an axis. Other possibilities also exist.

On the basis of the received data at step 801, a set of at least two boundary conditions are defined at step 803 for each component of the motion of the element with respect to time. The boundary conditions relate to the path of the element with respect to time as described above with reference to FIGS. 1 to 4.

Specifically, upper and lower bounding curves such as curves 207, 209 of FIG. 2 as defined from the path 205 of the element 201 of FIG. 2, define a stabilization band for a sub-area of the image capture area of the image capture element. The stabilization band for the sub-area defined by the boundary conditions, obtained at step 805, defines the domain in which compensatory translational motion of the sub-area may be applied in order to provide a stabilized sequence of images. At step 807, an optimal stabilization path is derived. The stabilization path is obtained from a set of permissible paths lying within the stabilization band. The definition of the optimality of the stabilization path depends on the parameters used in order to obtain the path. Advantageously, the stabilization path is the geodesic in the domain defined by the stabilization band. Hence, the optimality of the path is defined, in this case, by the fact that the path is the locally length minimizing curve within the band.

Alternatively, the stabilization path is the path of minimum curvature within the stabilization band, and is therefore optimal in the sense that its path of minimum curvature is within the band.

The stabilization path is that followed by a sub-area of the capture area of an image capture element, and as such, need not be limited to the above definitions. In fact, any suitable path within the stabilization band may be defined as the stabilization path.

At step 809 a stabilized video sequence is obtained. The stabilized video sequence comprises a sequence of images. The stabilized sequence is obtained by translating a sub-area of the image capture area of an image capture element in response to the stabilization path obtained at step 807. Specifically, a sub-area of the image capture area of an image capture element is translated across the image capture area of the element by following the stabilization path derived at step 807. In this manner, an optimally stabilized video sequence is obtained. The optimality of the video sequence obtained is therefore dependent upon the derived stabilization path. Further, it will be appreciated that the definition of the stabilization band results in the a stabilization path which is followed by a sub-area of the capture area of an image capture element such that the sub-area lies wholly within the capture area of the image capture device along the length of the stabilization path, thereby resulting in a stabilized sequence of images in which no adverse effects such as clipping of the sequence of images occur.

The same procedure as above is followed for each component of motion which requires stabilization. The resulting stabilized components may then be combined in order to provide a stabilized sequence of images.

In an embodiment, the stabilization band is discretised in order to provide a discretised stabilization band (the process of discretising). In this manner, a path derived within the discretised band will, itself, be defined in discrete terms, and may be described in terms of a piecewise polynomial for example. A dynamic programming algorithm may be applied to the data defining the discretised path and band in order to derive a stabilization path.

The formulation of stabilization in terms of the above variational calculus is readily extended to multivariate functionals.

Separable functionals which can be optimized with respect to one parameter at a time may be used. In the case of the length-minimizing functional as used throughout the present description, a multidimensional formulation is:

$$E[f_1(t), f_2(t), \ldots] = \int \sqrt{\left[\left(\frac{\partial f_1(t)}{\partial t}\right)^2 + \left(\frac{\partial f_2(t)}{\partial t}\right)^2 + \ldots + 1\right]} dt$$

Minimizing the above functional is equivalent to minimizing separate functionals of the form given previously for the arc length of a curve.

The multidimensional trajectory with the band constraints is a generalized cylinder ("pipe") with rectangular cross-section and the minimization of the functional using the method as exemplified above yields the stabilized trajectory through it.

If the entire image sequence is not known before the method of various embodiments is applied, the stabilization will be sub-optimal in the sense that the degree of forward visibility is reduced thereby reducing the efficiency of the dynamic programming algorithm.

In contrast to the above method wherein stabilization proceeds by applying the method to a wholly known captured sequence of images, a further embodiment provides that the method of obtaining a stabilized image sequence may be applied 'on the fly', i.e., contemporaneous to the capture of the sequence of images.

In order to facilitate this, a sliding fixed-length trellis that "probes" the best future path and uses only the first portion of it to make up the overall path is provided. The process is outlined diagrammatically with reference to FIG. 9. At any given time t, a time slice of T samples of the input curve is obtained and the Viterbi procedure as described above is applied to it.

Of the sequence of states, $$\hat{Q} = \{\hat{q}_1, \hat{q}_2, \ldots, \hat{q}_T\}$$

which defines the best path for the time slice, the second state $\hat{q}_2$ is retained, and an optimal path through the time slice is obtained. It will be appreciated that a state other than the second state may be retained. For example, the third or fourth state may be retained. Alternatively, a number of states may be collectively retained. States two, three and four may be retained, for example.

Figure 9:
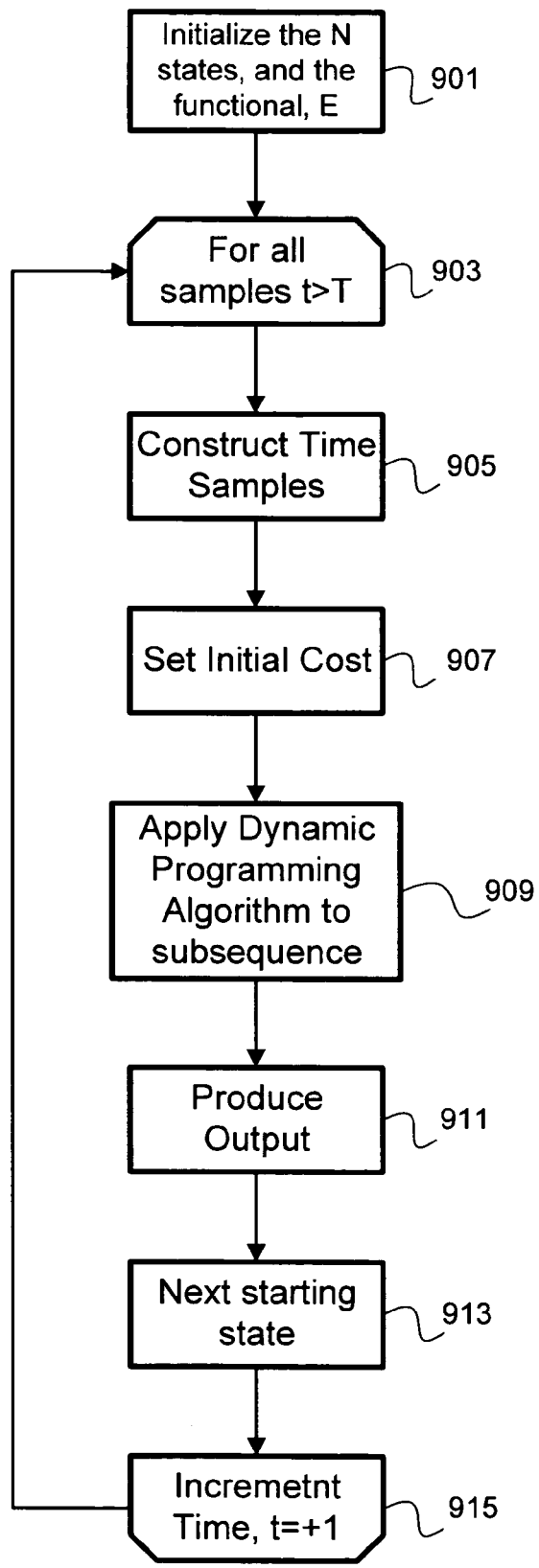
FIG. 9 is a flow diagram representing a further stabilization procedure.

With reference to FIG. 9, at step 901, initialization is carried out. Specifically, for the N states, $\pi_{N/2}=0$ and $\forall 1 \leq i \leq N$ ^i≠N/2 the $\pi_i=\infty$, i.e., the initial state at the center of the trellis is initialized to have a cost of zero associated with it. All other states are initialized to have infinite cost, or any other suitably highly valued cost value. The initial costs are set at step 907.

For all samples of a sequence of images at a time t>T where T represents the length of the fixed-length trellis, a set of time samples is constructed at step 905. Specifically, the set $$T = \{t-T, t-T+1, \ldots, t\}$$

is constructed. Each of the samples of a sequence of images will be an image frame of the sequence. Other alternatives are possible.

At step 909, a dynamic programming algorithm is applied to the set of samples obtained at step 905. The algorithm is the Viterbi algorithm. As mentioned above, other suitable algorithms may be used.

At step 911, the following output is produced, $$\hat{f}(t-T) = f(t-T) + w_f - 2w_f s(\hat{q}_2)$$

This is the output at time t−T. Corresponding outputs will be produced for each sample at time times t−T+1, . . . At step 913, the next starting state is set. Specifically, $$\pi_{\hat{q}_2} = 0$$

and $\forall i < N$ ^i≠$\hat{q}_2$ the $\pi_i = \infty$ any other suitably highly valued cost value. Hence, the next starting state is set to $\hat{q}_2$. At step 915 the time is incremented, and the procedure continues for the new value of t.

The optimality of the path obtained via the process as described with reference to FIG. 9 is related to the length of T. Specifically, the optimality is related to the amount of forward visibility of the sequence of images. In this connection, if processing of a sequence of images in accordance with the method of FIG. 8 is to be carried out 'on-line', an image capture device will require a suitable buffer in order to be able to store a number of image frames, such as buffer 1120 of FIG. 11 for example. Increasing the length of T increases the quality of the stabilized sequence of images but will increase the time delay associated with producing such a sequence.

Examples of the sliding trellis approach as applied to an image sequence are depicted diagrammatically in FIGS. 10a to 10d.

FIGS. 10a to 10d depict the temporal progression of the fixed-length trellis. The trellis 1001 is shifted, over time, through the stabilization band, which band is defined with respect to the path 1005 of an image capture element of an image capture device (not shown) as described above with reference to FIGS. 1 to 5. The most optimal path through the band is calculated, with the second state, $\hat{q}_2$, being used to determine the next point in the trellis corresponding to the next vertex of the stabilized path 1007.

In this connection, a trellis of a given size is used in association with a dynamic programming algorithm such as the Viterbi algorithm. The trellis 'sits' over a portion of a discretised path of an image capture element within the stabilization band (as exemplified by FIGS. 10a-d), and a stabilization path is derived using the dynamic programming algorithm at each point along the length of the discretised path. The final stabilization path which is used in association with data from respective sub-areas of a capture area of an image capture element in order to derive/produce a stabilized sequence of images or data relating thereto is therefore 'built-up' by concatenating the results of the dynamic programming algorithm as applied to the discretised path using the discrete trellis in order to produce a stabilized path.

Figure 11:
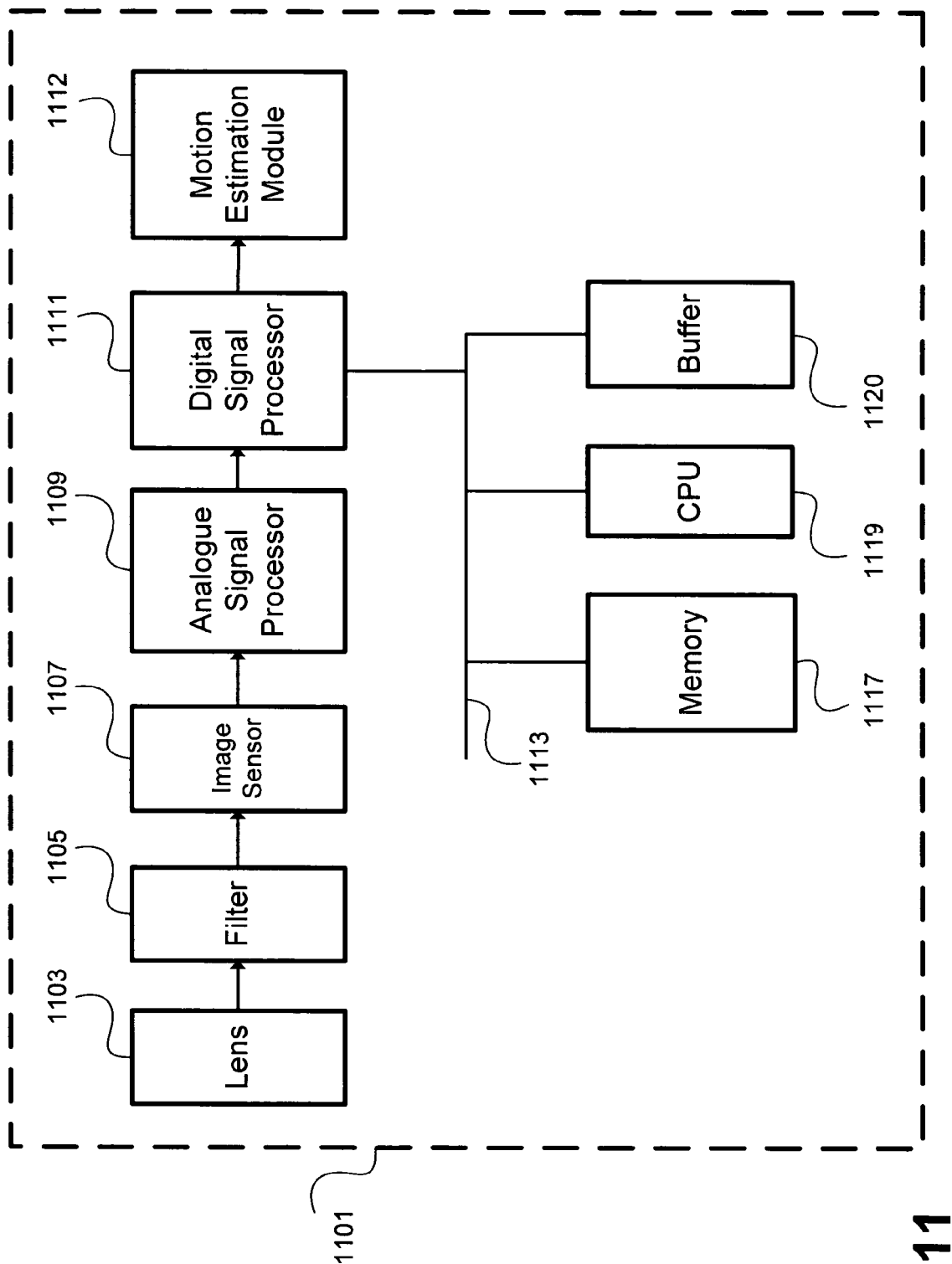
FIG. 11 is a diagrammatic representation of an image capture device.

The architecture of a suitable image capture device 1101 embodiment which may be used in accordance with the procedure described above with reference to FIGS. 9 and 10 is depicted diagrammatically in FIG. 11. The device 1101 incorporates the necessary functionality in order to independently operate according to the procedure described with respect to FIGS. 9 and 10. Specifically, the device 1101 comprises a lens assembly 1103, a filter 1105, image sensor 1107, analogue signal processor 1109, digital signal processor 1111, a motion estimation module 1112 and a buffer 1120. An image or scene of interest is captured from light passing through the lens assembly 1103. The light may be filtered using the filter 1105. The image is then converted into an electrical signal by image sensor 1107 which could be a CCD (charge-coupled device) or a CMOS (complementary metal oxide semiconductor) device, for example. This raw image data is then routed through an analog signal processor (ASP) 1109. The raw image data is then passed to the digital signal processor (DSP) 1111.

Further, with reference to the device 1101 of FIG. 11, a bus 1113 is operable to transmit data and/or control signals between the DSP 1111, memory 1117, buffer 1120 and the central processing unit (CPU) 1119.

Memory 1117 may be dynamic random-access memory (DRAM) and may include either non-volatile memory (e.g., flash, ROM, PROM, etc.) and/or removable memory (e.g., memory cards, disks, etc.). Memory 1117 may be used to store raw image digital data as well as processed image digital data. CPU 1119 is a processor which can be programmed to perform various tasks associated with the device 1101. CPU 1119, memory 1117 and the motion estimation module 1112 are further operable to estimate the motion of the device 1101 using a known image based estimating methods. Other alternatives are possible. For example, a mechanical estimation technique may be employed.

Image data stored in memory 1117 is processed by CPU 1119 in accordance with instructions stored in module 1112 (which may be ROM or a programmable circuit assembly such as an FPGA (flexible programmable gate array), or any other suitable device for storing instructions to be executed).

Buffer 1120 is operable to store image frames captured and processed as described above for utilization in accordance with the procedure as described with reference to FIGS. 9 and 10 above. Specifically, the buffer 1120 is operable to store a number of image frames corresponding to portion of a sequence of images of length T corresponding to the length of the fixed-length trellis.

It should be noted that there are many different configurations which can be used. In one embodiment, the CPU 1119, the module 1112 and the DSP 1111 reside on a single chip. In other embodiments, the CPU 1119, module 1112 and DSP 1111 reside on two or more separate chips, for example. Further combinations are anticipated, but it should be noted that the exact architecture of the device 1101 and/or the components therein as outlined above are not intended to be limiting, and are merely presented in order to exemplify a typical image capture device with which the procedure as described above with reference to FIGS. 9 and 10 is operable.

Alternatively, the procedure described above with reference to FIGS. 9 and 10 may be performed using a suitable hardware/software configuration outside of the image capture device. The stabilization procedure may be performed using a suitable programmed computer, for example.

The procedure described above with reference to FIGS. 9 to 11 will be repeated for each component of motion of the image capture element of the device 1101. Specifically, there will be at least motion in each of the three spatial dimensions (x, y, z) and possibly also rotation of the element about an axis by an angle $\theta$. A stabilized version of the motion of the element is obtained using the procedures described above in order to obtain a set of three stabilized components $\hat{f}_X(t-T)$, $\hat{f}_Y(t-T)$ and $\hat{f}^\theta(t-T)$.

The stabilizing corrections therefore applied to a frame of a sequence of images obtained at time $t-T$ are then the translations $\hat{f}_X(t-T) - f_X(t-T)$, $\hat{f}_Y(t-T) - f_Y(t-T)$ and the rotation $\hat{f}_\theta(t-T) - f_\theta(t-T)$.

Figure 12:
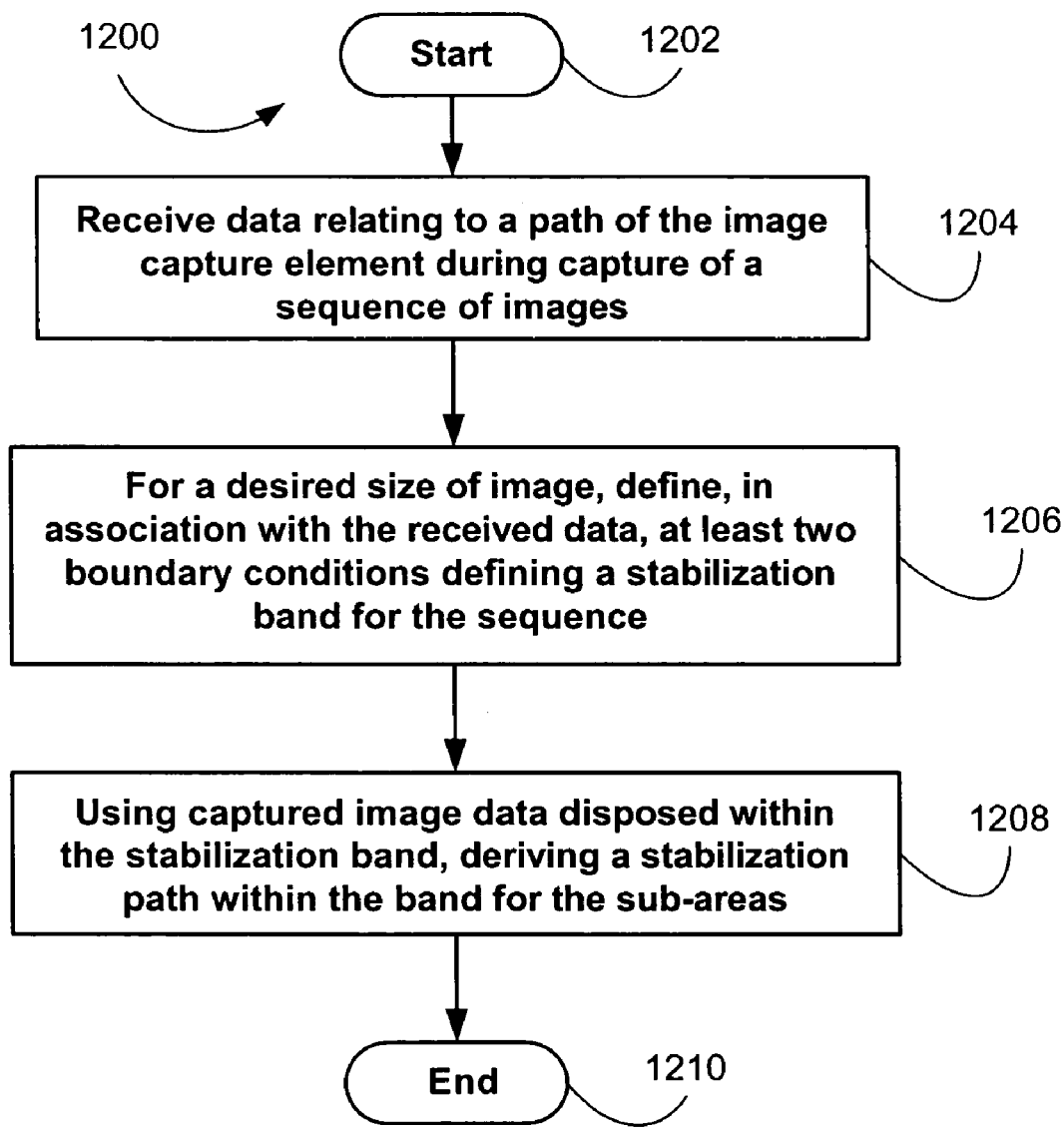
FIGS. 12 and 13 are flowcharts illustrating exemplary embodiments of a process for stabilizing a sequence of images.
Figure 13:
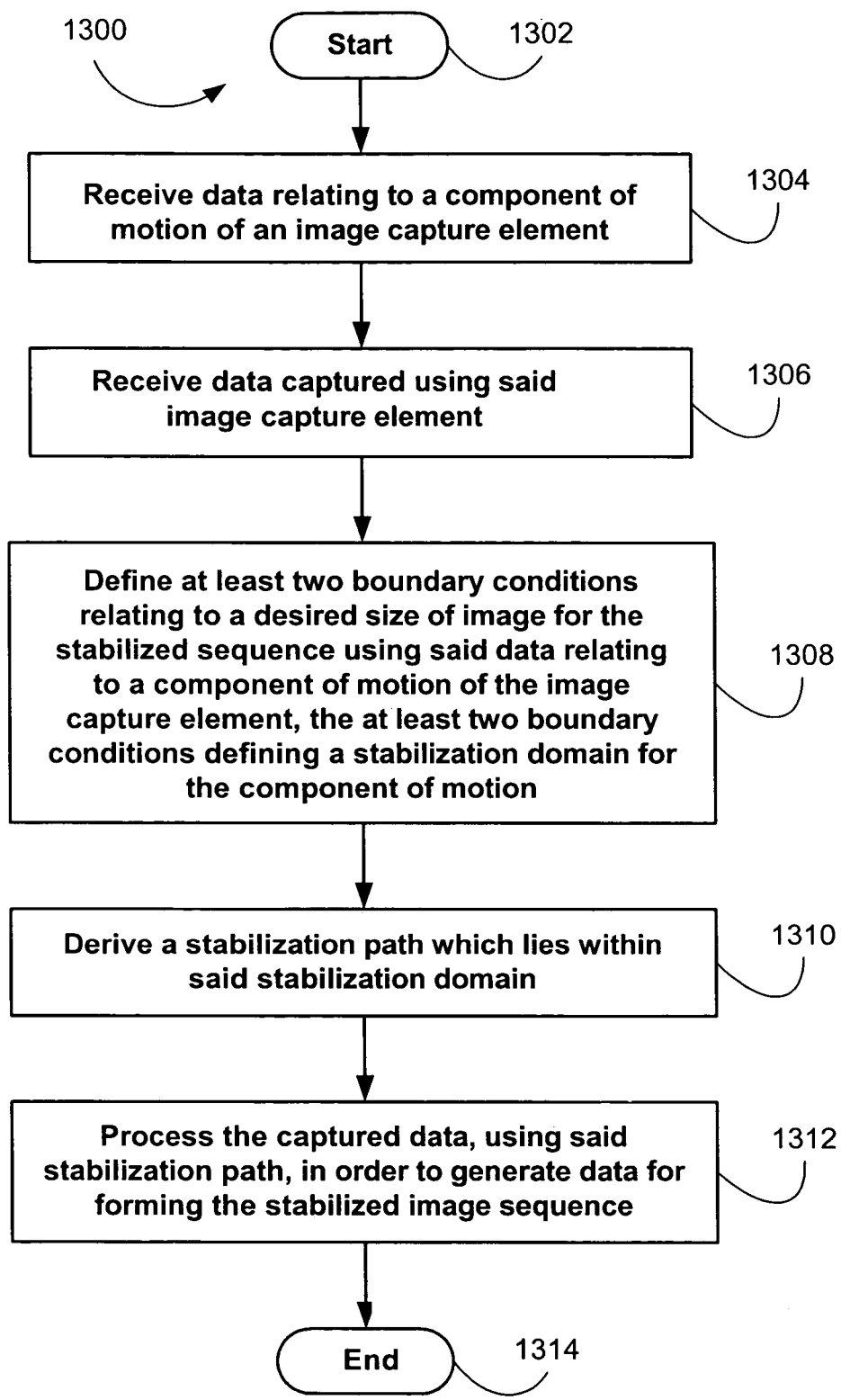

FIGS. 12 and 13 are flowcharts 1200 and 1300, respectively, illustrating exemplary embodiments of a process for stabilizing, a sequence of images. The flow charts 1200 and 1300 show the architecture, functionality, and operation of an embodiment for implementing an embodiment such that a sequence of images are stabilized. An alternative embodiment implements the logic of flow charts 1200 and/or 1300 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIGS. 12 and/or 13, or may include additional functions. For example, two blocks shown in succession in FIGS. 12 and/or 13 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

With respect to FIG. 12, the process of stabilizing a sequence of images captured from respective sub-areas of a capture area of an image capture element starts at block 1202. At block 1204, data is received relating to a path of the image capture element during capture of a sequence of images. At block 1206, for a desired size of image, in association with the received data, at least two boundary conditions defining a stabilization band for the sequence are defined. At block 1208, using captured image data disposed within the stabilization band, a stabilization path within the band for the sub-areas is derived. The process ends at block 1210.

With respect to FIG. 13, the process of stabilizing a sequence of images starts at block 1302. At block 1304, data is received relating to a component of motion of an image capture element. At block 1306, data captured using the image capture element is received. At block 1308, at least two boundary conditions are defined relating to a desired size of image for the stabilized sequence using said data relating to a component of motion of the image capture element, the at least two boundary conditions defining a stabilization domain for the component of motion. At block 1310, a stabilization path is derived which lies within said stabilization domain. At block 1312, the captured data is processed, using said stabilization path, in order to generate data for forming the stabilized image sequence. The process ends at block 1314.

It should be emphasized that the above-described embodiments are merely examples of the disclosed system and method. Many variations and modifications may be made to the above-described embodiments. All such modifications and variations are intended to be included herein within the scope of this disclosure.

What is claimed:

1. A method of stabilizing a sequence of images captured from respective sub-areas of a capture area of an image capture element, the method comprising:

receiving data relating to a path of the image capture element during capture of a sequence of images;

for a desired size of image, defining, in association with the received data, at least two boundary conditions defining a stabilization band for the sequence;

using captured image data disposed within the stabilization band, deriving a stabilization path within the band for the sub-area;

defining an associated trellis of length T within the stabilization band:

incrementally shifting the position of the trellis with respect to time along the stabilization band; and for each position of the trellis within the stabilization band, deriving a portion of a stabilization path from data disposed within the stabilization band at the position of the trellis within the band.

2. A method as claimed in claim 1, wherein the data relating to a path relates to a component of motion of the image capture element in a spatial dimension with respect to time.

3. A method as claimed in claim 2, wherein the component is at least one of a horizontal, vertical, and rotational component of the path of the image capture element.

4. A method as claimed in claim 1, wherein each of said respective sub-areas is the same size.

5. A method as claimed in claim 1, further comprising:
discretising said stabilization band in order to provide a discretised stabilization band.

6. A method as claimed in claim 5, wherein said discretised stabilization band is in the form of a trellis of finite size.

7. A method as claimed in claim 1, further comprising:
discretising said data relating to the path of the image capture element in order to provide discretised data relating to the path of the image capture element.

8. A method as claimed in claim 1, further comprising:
receiving data relating to a time slice of length T of data relating to a path of the image capture element during capture of a sequence of images.

9. A method as claimed in claim 8, further comprising:
concatenating said derived portions of the stabilization path in order to provide a full stabilization path.

10. A method as claimed in claim 1, wherein said derivation is carried out using a dynamic programming algorithm.

11. A method as claimed in claim 10, wherein said dynamic programming algorithm is a Viterbi algorithm.

12. A method as claimed in claim 1, wherein said at least two boundary conditions relate to a difference in the dimensions between said sub-areas and said image capture area.

13. A method as claimed in claim 1, wherein said stabilization band defines a stabilization domain containing a plurality of permissible, continuous stabilization paths.

14. A method as claimed in claim 13, wherein at least one of the plurality of stabilization paths is a geodesic in the stabilization domain.

15. A method as claimed in claim 13, wherein at least one of the plurality of stabilization paths is a path of minimum curvature within the stabilization band.

16. A method as claimed in claim 1, wherein said sub-areas are arranged along said stabilization path in order to provide a stabilized sequence of images.

17. A method of stabilizing a sequence of images comprising:
receiving data relating to a component of motion of an image capture element;
receiving data captured using said image capture element;
defining at least two boundary conditions relating to a desired size of image for the stabilized sequence using said data relating to a component of motion of the image capture element, the at least two boundary conditions defining a stabilization band for the component of motion;
deriving a stabilization path which lies within said stabilization band;
processing the captured data, using said stabilization path, in order to generate data for forming the stabilized image sequence;
defining an associated trellis of length T within the stabilization band; incrementally shifting the position of the trellis with respect to time along the stabilization band; and
for each position of the trellis within the stabilization band, deriving a portion of a stabilization path from data disposed within the stabilization band at the position of the trellis within the band.

18. A method as claimed in claim 17, wherein the data relating to a component of motion of the image capture element relates to a component of motion of the image capture element in a spatial dimension with respect to time.

19. A method as claimed in claim 18, wherein the component is at least one of a horizontal, vertical, and rotational component of the path of the image capture element.

20. A method as claimed in claim 17, further comprising:
discretising said stabilization band in order to provide a discretised stabilization band.

21. A method as claimed in claim 17, further comprising:
discretising said data relating to the stabilization path in order to provide discretised data relating to the stabilization path.

22. A method as claimed in claim 20, wherein said discretised stabilization band is in the form of a trellis of finite size.

23. A method as claimed in claim 17, further comprising:
receiving data relating to a time slice of length T of data relating to a path of the image capture element during capture of a sequence of images.

24. A method as claimed in claim 23 further comprising concatenating said derived portions of the stabilization path in order to provide a full stabilization path.

25. A method as claimed in claim 17, wherein said derivation is carried out using a dynamic programming algorithm.

26. A method as claimed in claim 25, wherein said dynamic programming algorithm is a Viterbi algorithm.

27. A method as claimed in claim 17, wherein said stabilization domain contains a plurality of permissible, continuous stabilization paths.

28. A method as claimed in claim 27, wherein at least one of the plurality of stabilization paths is a geodesic in the stabilization domain.

29. A method as claimed in claim 27, wherein at least one of the plurality of stabilization paths is a path of minimum curvature within the stabilization band.

30. Apparatus suitable for stabilizing a sequence of images captured from respective sub-areas of a capture area of an image capture element, comprising:
a processor that receives data relating to a path of the image capture element during capture of a sequence of images;
a module that defines, in association with the received data, at least two boundary conditions defining a stabilization band for the sequence for a desired size of image,
a trellis, the trellis a two-dimensional array of discrete points, wherein data is received by the processor relating to a time slice of length T of data relating to a path of the image capture element during capture of a sequence of images, and wherein the processor defines the trellis of length T within the stabilization band;
wherein the processor derives a stabilization path within the band using captured image data disposed within the stabilization band, for the sub-areas, incrementally shifts the position of the trellis with respect to time along the stabilization band, and, for each position of the trellis within the stabilization band, derives a portion of a stabilization path from data disposed within the stabilization band at the position of the trellis within the band.

31. Apparatus as claimed in claim 30, further comprising a buffer operable to store data relating to a path of the image capture element or a portion thereof.

32. Apparatus as claimed in claim 30, further comprising a buffer operable to store data relating to images captured using said image capture element.

33. Apparatus as claimed in claim 30, further comprising the sub-area, wherein the sub-area resides in a portion of the image capture element.

34. A computer-readable medium encoded with a computer program for processing a sequence of images captured using an image capture area of an image capture element and, the program comprising logic configured to:
- receive data relating to a path of the image capture element during capture of a sequence of images;
- define, in association with the received data and for a desired size of image, at least two boundary conditions defining a stabilization band for the sequence; and
- derive, using captured image data disposed within the stabilization band, a stabilization path within the band for the sub-areas;
- define an associated trellis of length T within the stabilization band;
- incrementally shift the position of the trellis with respect to time along the stabilization band; and
- for each position of the trellis within the stabilization band, derive a portion of a stabilization path from data disposed within the stabilization band at the position of the trellis within the band.

* * * * *